Nov. 20, 1934.  T. THEODORSEN  1,981,007

ANALYSIS OF ELECTRIC CURRENTS BY THERMAL EFFECTS

Filed Jan. 31, 1931  2 Sheets-Sheet 1

INVENTOR
THEODORE THEODORSEN

BY Robert H. Young
ATTORNEY

Nov. 20, 1934.   T. THEODORSEN   1,981,007
ANALYSIS OF ELECTRIC CURRENTS BY THERMAL EFFECTS
Filed Jan. 31, 1931   2 Sheets-Sheet 2

INVENTOR
THEODORE THEODORSEN
BY Robert H. Young
ATTORNEY

Patented Nov. 20, 1934

1,981,007

UNITED STATES PATENT OFFICE 1,981,007

ANALYSIS OF ELECTRIC CURRENTS BY THERMAL EFFECTS

Theodore Theodorsen, Langley Field, Va.

Application January 31, 1931, Serial No. 512,717

17 Claims. (Cl. 175—183)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to the analysis of electric currents or other forms of energy capable of being transformed into proportional electric currents. An important object of the invention is to simplify the examination and analysis of wave energy such as sound by resolving it into its component parts.

It is well known that the analysis of electric currents hitherto has been effected by employing some system of resonant circuits, either electrical or mechanical. The inherent difficulties of such arrangements have restricted their use to a limited range in actual practice.

The present invention provides a basically and fundamentally new method of analyzing alternating or variable currents. The inventive concept embraces a method and means for impressing the unknown current or currents and also a known current simultaneously on the cathode or filament of a vacuum tube, in connection with suitable means for indicating and recording the resulting heating effect or reaction of said filament. The known current is made to vary in frequency from zero to any desired maximum value. On passing through a frequency which corresponds to one of the frequencies in the unknown current, a large increase in the temperature of said filament takes place. Hence, the system may be said to embody the essential elements of a new type of resonator, or analyzer the action of such an instrument will be evident to those familiar with the mathematics of harmonic functions. The heat produced in the filament is proportional to the square of the separate components of the current. There is no heat produced by the product of such currents, because the time average actually is equal to zero. However, if the difference between the frequencies of the two impressed currents is low enough, a beat frequency will make itself evident as a periodic variation of the temperature of the responsive element around the original steady value. This effect forms the underlying principle of this invention. The amplitude of this temperature variation is proportional to the products of the two currents and depends in a known manner on the difference between the frequencies of the two currents, no effect being observable unless the frequencies are very nearly equal. It is pointed out that this kind of resonance is exceedingly sharp, and an instrument embodying this principle is in this respect superior to existing types.

It is also pointed out that this sharpness, or apparent damping, remains constant over the entire range of audio frequencies. If, for instance, the unknown current contains a frequency of, say, 4000 vibrations per second and the frequency of the known current, which may be termed the search current and which contains but a single frequency, is caused to approach 4000 vibrations per second, a pronounced increase in the filament temperature will be apparent to the observer when the difference between the two frequencies is not more than a few vibrations per second.

Means of suitable and well known character may be provided for causing a continuous change in said search current throughout any range desired. Means are also provided for the automatic recording of the response on a photographic film or for a visual reproduction of same.

The various features of the invention will be apparent from the following description, taken in connection with the accompanying drawings, in which.

Figure 1:
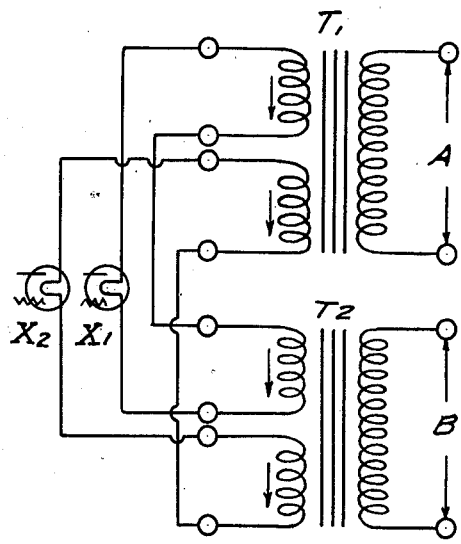
Figure 1 illustrates an arrangement of circuits and transformers for supplying electric currents of known and unknown values to the filaments of vacuum tubes in accordance with the principles of the invention.
Figure 2:
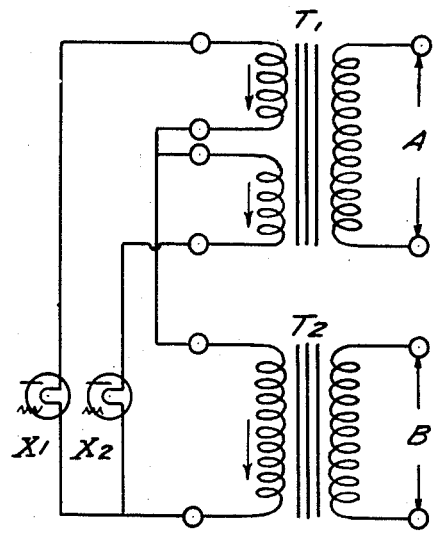
Figures 2 and 3 are modified circuit arrangements.
Figure 3:
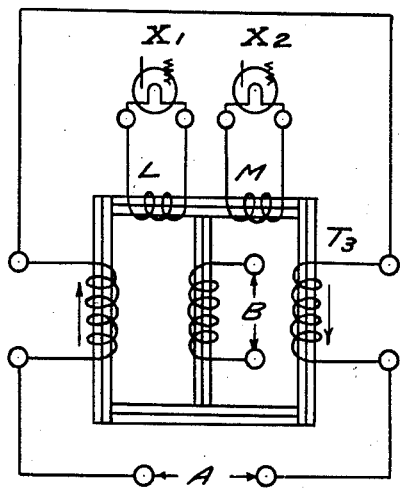

Figures 1, 2, and 3 indicate three possible methods of supplying, by means of suitable transformers, the known and the unknown currents to the filament of the vacuum tube or tubes. In these figures, A represents the unknown current, B the known and variable search current. $X_1$ and $X_2$ represent two vacuum tubes, or essentially their cathodes or filaments. $T_1$, $T_2$, and $T_3$ are the transformers.

Referring to Figure 1, the primaries of transformers $T_1$ and $T_2$ are supplied from the sources A and B, respectively. The secondaries of both transformers are double. Each coil of the secondary transformer $T_1$ is connected in series with one coil constituting the secondary of transformer $T_2$, forming two independent circuits. The electrical forces in these circuits are in conjunction and opposition, respectively, as clearly indicated by the arrows.

In Figure 2, the transformer $T_2$, is provided only with a single secondary coil. The electric forces from the double secondary of the other transformer $T_1$ are arranged in conjunction and in opposition, respectively, working through the resistances or filaments of vacuum tubes $X_1$ and $X_2$.

In Figure 3, the magnetic rather than the electric forces, are arranged in the desired manner. The magnetic field, passing through the coil L, is composed of the vector sum of the field produced by the source A and that produced by the source B, while the magnetic field through M is composed of field A plus field B, with the latter rotated at one hundred eighty degrees. L and M supply the two resistances or vacuum tube filaments $X_1$ and $X_2$, respectively. $X_1$ and $X_2$ may, or may not, be electrically separated.

It will be noticed that the sum and the difference of the voltages of the two sources are impressed respectively on the two filaments, $X_1$ and $X_2$. No invention is claimed for these circuits, and any other convenient arrangement serving a like purpose may be employed. Such circuits are well known in testing systems, but the voltages from the known and unknown sources are impressed on the grid elements, that is to say the normal function of the vacuum tubes is utilized in such arrangements; whereas in the present invention the known and unknown currents are fed directly to a resistance such as the filament of an electronic discharge device and utilizes the thermal effects of such filaments or equivalent elements in accordance with the principle of the invention herein outlined. I am also aware that two element vacuum tubes have been used as relays, but with no idea of utilizing filament temperature variations in a direct way for alternating or variable current analysis.

Figure 4:
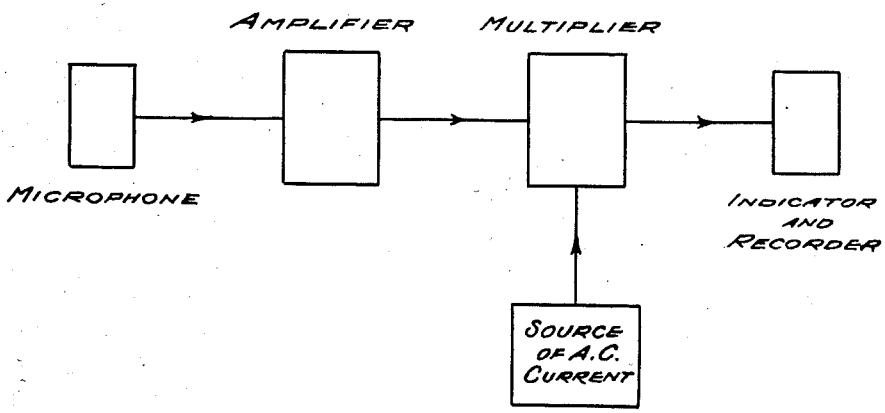
Figure 4 illustrates a schematic arrangement of circuits and apparatus for employing the principles of the invention in the analysis of sound.

Figure 4 indicates schematically how the unknown current, produced in this case in a microphone, and the known current, produced by a source of alternating current, both are fed into the main unit which for convenience of reference may be termed a multiplier. The output from the multiplier is finally fed into a recorder or indicator.

Figure 5:
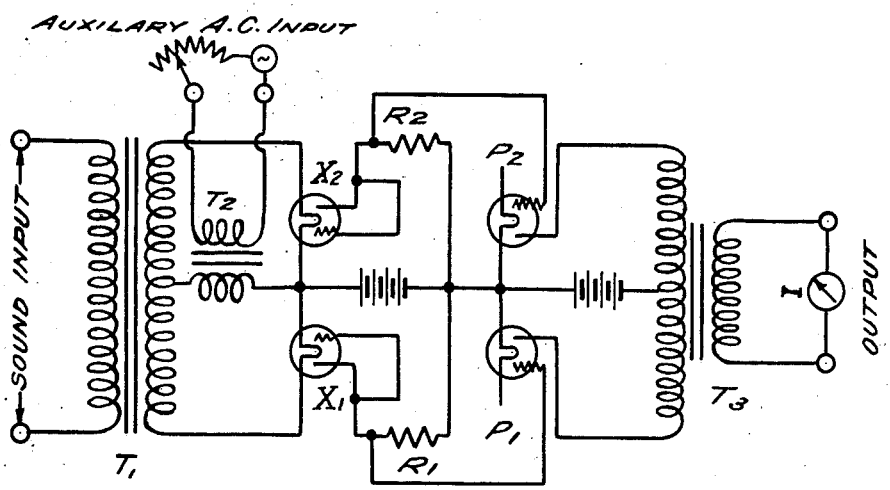
Figure 5 is a diagrammatic illustration of a circuit arrangement and apparatus for carrying out the principles of the invention in sound and current analysis.

The electrical diagram of a hook-up, indicating a typical method of employing the basically new principle of current analysis described in the preceding paragraphs is given in Figure 5. In this figure the input to the filaments is arranged as in Figure 2. $X_1$ and $X_2$ represent two vacuum tubes. In this particular arrangement the temperatures of the two tubes are opposite in phase. The two tubes, $X_1$ and $X_2$, represent the very heart of the device. The remainder of the hook-up is of a familiar type. The periodic variation of the filament temperature will cause a periodic change of the plate to filament resistance. One convenient method of detecting such variation of the resistance, is to apply a fixed voltage to the plate, as shown in Figure 5. The grid and plate or anode may be tied together as shown. The fluctuations in the plate current are amplified by a push-pull arrangement, as shown. $R_1$ and $R_2$ are two resistances, and $P_1$ and $P_2$ are two vacuum tubes in regular push-pull circuit.

The output is fed to an indicator, which may include a recorder, as will appear from Fig. 4. The indicator may take the form of a meter mechanism, such as a low frequency milliammeter. When resonance occurs between the search current of known frequency and one of the components of the unknown current, this condition is made evident by a violent response of the milliammeter or other indicator.

This basic invention may also be employed to advantage by feeding two currents, both of which are known to the filament of a vacuum tube. If said frequencies are identical, there will occur an increase in the filament temperature equal to the power product of the two currents. By opposing said currents, a decrease in the temperature will occur. This decrease will also be dependent on the power product of the two currents.

The invention has been described in connection with certain preferred embodiments, but it will be understood that the basic principle of frequency analysis is capable of many other modifications widely differing from those herein indicated or described, the scope of the invention being defined by the appended claims.

What is claimed is:

1. The method of analyzing oscillatory electric currents, which consists in combining currents of unknown frequency and a current of known frequency; simultaneously converting the combined currents into heat energy; and employing the response in heat energy to indicate the frequencies of the unknown currents.

2. The method of analyzing oscillatory electric currents, which consists in combining currents of unknown frequencies and a variable current having a range of known frequencies; varying the current of known frequency while simultaneously converting the combined currents into heat energy; and employing the resultant heat energy to indicate the frequencies of the unknown currents.

3. In a system of analyzing oscillatory electric currents, involving the use of electron discharge devices, the method of operation which consists in combining currents of unknown frequency and a current of known frequency; simultaneously feeding the combined currents to the cathode element of an electron discharge device; and employing the response in heat energy produced in said cathode to indicate the frequency of the unknown current components.

4. In a system of analyzing unknown wave energy factors involving the use of electron discharge devices, the method of operation which consists in transforming the energy into proportional electric currents; combining a known current with the unknown currents; simultaneously feeding the resultant of said currents to the cathodes of the electron discharge devices; and utilizing the response in heat energy of said cathodes to analyze the unknown energy factors.

5. In a system of analyzing and measuring unknown factors of low frequency wave energy involving the use of electron tubes, the method of operation which consists in converting the said wave energy into equivalent electric components; combining an oscillatory current of known value with the unknown electric components; simultaneously feeding the product of the combined currents to the filaments of the electron tubes, while varying the known current through a controlled range of frequencies; and analyzing the resultant heat energy periodically produced in said filaments to indicate and measure the frequency of the unknown current components corresponding to the said unknown energy factors.

6. In a system of analyzing oscillatory electric currents involving the use of electron tubes, the method of controlling and measuring current components of different frequencies, which consists in feeding at least two such components to the filaments of electron tubes; and utilizing the resulting temperature response of said filaments to indicate and measure the product of said components.

7. In a system of electric current analysis involving the use of electron discharge devices, the method of controlling and measuring the frequency difference between current components, which consists in feeding at least two components in opposing relation to the cathodes of such electron discharge devices; and utilizing the temperature response of said cathodes to indicate and measure the frequency difference.

8. A system of analyzing oscillatory electric currents, comprising a current source of unknown frequencies and a current source of known frequencies; circuit means for combining the respective currents, including means for converting the combined frequencies into heat energy; and means for utilizing the heat energy response to indicate the frequency value of the unknown currents.

9. A system of analyzing unknown factors of wave energy, comprising means for translating the wave energy into proportional electric currents; a current source of known frequency range; circuit means for combining the unknown and known currents, including a resistance element for simultaneously converting the combined currents into heat energy; and means for utilizing the heat energy for analyzing the current components corresponding to said unknown factors of wave energy.

10. A system of analyzing oscillatory electric currents, comprising a current source of unknown frequency range and a source of known frequency range; electron discharge devices having cathodes and output electrodes; circuit means for combining and feeding the respective currents to said cathodes; and means operative with the output electrodes for analyzing the unknown frequencies in accordance with the temperature response of said cathodes.

11. A system of analyzing and measuring oscillatory electric currents, comprising a current source of unknown frequency components and a source of known frequency components; means for periodically varying the known frequencies over a predetermined range; electron discharge devices having cathodes and output electrodes; circuit means operative with said devices for combining a series of predetermined frequencies with the unknown frequency components and simultaneously feeding the resultant to said cathodes; and means operative with the output electrodes for analyzing and measuring the unknown frequency components in accordance with the periodic temperature response of said cathodes.

12. In a system of analyzing and measuring unknown wave energy, comprising means for converting the said wave energy into equivalent electric components; a current source of known frequency components; means for varying the known frequencies over a predetermined range; electron discharge devices having cathodes and output electrodes; circuit means operative with said devices for combining a series of predetermined frequencies with the unknown frequency components and simultaneously feeding the resultant to said cathodes; and means operative with the output electrodes for measuring the unknown frequency components in accordance with the periodic temperature response of said cathodes.

13. In a system of analyzing and controlling oscillatory electric currents, electron discharge devices and circuits operative therewith; means for producing low frequency oscillations, comprising in combination a current source of predetermined variable frequency components; circuit means for combining and feeding at least two of such components to the cathodes of said electron discharge devices; and means for indicating and measuring the product of the combined frequency components in accordance with the temperature response of said cathodes.

14. A system of analyzing oscillatory electric currents, comprising a current source of unknown frequency components; a current source of known variable frequency, having means for varying the same over a predetermined range; circuits for combining the respective currents; resistance means operative with said circuits for converting the combined currents into heat energy; and means to indicate and measure the product of the combined currents in accordance with the periodic temperature response of said resistance means.

15. A system of controlling and measuring oscillatory electric currents, comprising electron tubes and circuits operative therewith; current sources of predetermined components of different frequencies; circuit means for feeding at least two of such components in opposing relation to the cathodes of said electron tubes; and means for indicating and measuring the differential product of said components in accordance with the decrease in temperature response of said cathodes.

16. In a system of wave energy analysis, the method which consists in combining a complex wave of unknown frequency components with any one component of a wave of known frequencies; converting the combined components into heat energy; and employing the heat energy to develop and evaluate the periodic response as the unknown and known frequency components approach a thermal response peak.

17. A system of analyzing oscillatory electric currents, comprising a current source of unknown frequencies and a current source of known frequencies; circuit means for combining the respective currents, including means comprising a resistance element acting thermally to convert the said combined currents into heat energy; and means for utilizing the heat energy response to indicate the frequency value of the unknown currents.

THEODORE THEODORSEN.